United States Patent
Tennur Narayanan et al.

(10) Patent No.: US 11,595,525 B2
(45) Date of Patent: Feb. 28, 2023

(54) ASSIGNING CUSTOMER CALLS TO CUSTOMER CARE AGENTS BASED ON COMPATABILITY

(71) Applicant: Dell Products L.P., Round Rock, TX (US)

(72) Inventors: Tejas Naren Tennur Narayanan, Austin, TX (US); Gautam Kaura, Austin, TX (US); Sathish Bikumala, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/159,678

(22) Filed: Jan. 27, 2021

(65) Prior Publication Data
US 2022/0239777 A1    Jul. 28, 2022

(51) Int. Cl.
*H04M 3/523*    (2006.01)

(52) U.S. Cl.
CPC .............. *H04M 3/5233* (2013.01)

(58) Field of Classification Search
CPC ....... H04M 3/51; H04M 3/523; H04M 3/5233
USPC .............. 379/265.06–265.08, 265.11, 265.12
See application file for complete search history.

(56) References Cited

U.S. PATENT DOCUMENTS

| | | | | |
|---|---|---|---|---|
| 2010/0111287 A1* | 5/2010 | Xie | .............. | H04M 3/5232 379/265.13 |
| 2012/0051537 A1* | 3/2012 | Chishti | .............. | H04M 3/5233 379/265.11 |
| 2012/0183131 A1* | 7/2012 | Kohler | .............. | H04M 3/5238 379/265.12 |
| 2016/0119477 A1* | 4/2016 | Sharpe | .............. | G06Q 30/0261 379/265.09 |
| 2016/0119478 A1* | 4/2016 | Sharpe | .............. | H04L 67/141 379/265.09 |
| 2018/0278748 A1* | 9/2018 | Avila | .............. | G06Q 10/06398 |
| 2018/0278750 A1* | 9/2018 | Avila | .............. | H04L 51/02 |
| 2021/0105361 A1* | 4/2021 | Bergher | .............. | H04M 3/5232 |
| 2022/0046132 A1* | 2/2022 | Matula | .............. | G06F 40/30 |

* cited by examiner

*Primary Examiner* — Harry S Hong
(74) *Attorney, Agent, or Firm* — Daly, Crowley Mofford & Durkee, LLP (57) ABSTRACT

In one aspect, an example methodology implementing the disclosed techniques includes, in response to receipt at a call center of a call by a caller, generating a compatibility score for the caller, the compatibility score for the caller optimizes for caller satisfaction and potential upsell opportunities. The method also includes generating a compatibility score for individual agents available to handle the call, the compatibility score for the individual agents optimize for caller satisfaction and potential upsell opportunities. The method also includes matching the compatibility score for the caller to the compatibility scores for the individual agents and assigning an agent to the call based on the matching of the compatibility scores for the caller and the individual agents.

12 Claims, 6 Drawing Sheets

ASSIGNING CUSTOMER CALLS TO CUSTOMER CARE AGENTS BASED ON COMPATABILITY

FIELD

This disclosure relates generally to customer resource management, and more particularly, to techniques for customer and customer care agent compatibility matching.

BACKGROUND

Technical support is one of the key interfaces between companies and users of technology products or services. In general, companies offer technical support to customers to address and resolve specific problems the customer might be experiencing with the products or services sold by the company. Technical support may be delivered by various communication means such as telephone, email, and real-time or live chat.

A customer service center is a type of call center that is equipped to handle a variety of issues that arise between customers and companies. For example, some call centers assist customers with questions and issues with computer hardware or software or other products and services. These call centers typically employ large numbers of customer care agents who are assigned to handle the incoming calls from the customers. Within a call center, the incoming customer calls are commonly routed to customer care agents via rigid, predetermined routing rules—e.g., fixed order, round robin, longest idle, among others. However, routing customer calls to customer care agents in such manner often leads to poor and unsatisfactory customer experience. The companies also lose the opportunity to have a productive interaction—e.g., introduce new product or service—with the customers.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

Embodiments of the concepts, techniques, and structures disclosed herein include generating, computing, or otherwise deriving a respective compatibility score for a caller (e.g., customer) calling into a customer service center and the individual customer care agents (sometimes referred to herein more simply as "agents" or "agent" in the singular) who are available to handle the call, and assigning an available agent to the call based on a matching of the compatibility scores. The compatibility scores of the caller and the individual agents account for human relationship factors and increase customer satisfaction and potential revenue generating opportunities for the company.

In accordance with one illustrative embodiment provided to illustrate the broader concepts, systems, and techniques described herein, a computer implemented method to assign an agent to an incoming call to a call center includes, in response to receipt at a call center of a call by a caller, generating a compatibility score for the caller, the compatibility score for the caller optimizes for caller satisfaction and potential upsell opportunities. The method also includes generating a compatibility score for individual agents available to handle the call, the compatibility score for the individual agents optimize for caller satisfaction and potential upsell opportunities. The method also includes matching the compatibility score for the caller to the compatibility scores for the individual agents and assigning an agent to the call based on the matching of the compatibility scores for the caller and the individual agents.

In some embodiments, assigning an agent to the call comprises assigning an agent having a compatibility score that matches the compatibility score of the caller to the call.

In some embodiments, assigning an agent to the call comprises assigning an agent having a compatibility score that is closest to the compatibility score of the caller to the call.

In some embodiments, generating the compatibility score for the caller comprises applying a cost function to maximize caller satisfaction and potential upsell opportunities.

In some embodiments, generating the compatibility score for the individual agents comprises applying a cost function to maximize caller satisfaction and potential upsell opportunities.

In some embodiments, the compatibility score for the caller is based on one or more data sets indicative of attributes of the caller. In one aspect, the one or more data sets indicative of attributes of the caller includes at least one of a technical expertise estimate, a caller profile, an order information, a prior service requests, a customer purchasing pattern, or a purchase/selling power.

In some embodiments, the compatibility score for the individual agents is based on one or more data sets indicative of attributes of the individual agents. In one aspect, the one or more data sets indicative of attributes of the individual agents includes at least one of a technical expertise estimate, an agent profile, prior calls handled by the individual agents, or a purchase/selling power.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to, responsive to receipt at a call center of a call by a caller, generate a compatibility score for the caller, the compatibility score for the caller optimizes for caller satisfaction and potential upsell opportunities, and generate a compatibility score for individual agents available to handle the call, the compatibility score for the individual agents optimize for caller satisfaction and potential upsell opportunities. Execution of the instructions also causes the one or more processors to match the compatibility score for the caller to the compatibility scores for the individual agents and assign an agent to the call based on the match of the compatibility scores for the caller and the individual agents.

In some embodiments, to assign an agent to the call comprises to assign an agent having a compatibility score that matches the compatibility score of the caller to the call.

In some embodiments, to assign an agent to the call comprises to assign an agent having a compatibility score that is closest to the compatibility score of the caller to the call.

In some embodiments, to generate the compatibility score for the caller or the individual agents comprises to apply a cost function to maximize caller satisfaction and potential upsell opportunities.

In some embodiments, the compatibility score for the caller is based on one or more data sets indicative of attributes of the caller, the one or more data sets includes at least one of a technical expertise estimate, a caller profile, an order information, a prior service requests, a customer purchasing pattern, or a purchase/selling power.

In some embodiments, the compatibility score for the individual agents is based on one or more data sets indicative of attributes of the individual agents, the one or more data sets indicative of attributes of the individual agents includes at least one of a technical expertise estimate, an agent profile, prior calls handled by the individual agents, or a purchase/selling power.

According to another illustrative embodiment provided to illustrate the broader concepts described herein, a computer program product includes one or more non-transitory machine-readable mediums encoding instructions that when executed by one or more processors cause a process to be carried out for assigning an agent to an incoming call to a call center. The process includes, in response to receipt at a call center of a call by a caller, generating a compatibility score for the caller, the compatibility score for the caller optimizes for caller satisfaction and potential upsell opportunities. The process also includes generating a compatibility score for individual agents available to handle the call, the compatibility score for the individual agents optimize for caller satisfaction and potential upsell opportunities. The process also includes matching the compatibility score for the caller to the compatibility scores for the individual agents and assigning an agent to the call based on the matching of the compatibility scores for the caller and the individual agents.

In some embodiments, assigning an agent to the call comprises assigning an agent having a compatibility score that matches the compatibility score of the caller to the call or assigning an agent having a compatibility score that is closest to the compatibility score of the caller to the call.

In some embodiments, generating the compatibility score for the caller or the individual agents comprises applying a cost function to maximize caller satisfaction and potential upsell opportunities.

In some embodiments, the compatibility score for the caller is based on one or more data sets indicative of attributes of the caller, the one or more data sets includes at least one of a technical expertise estimate, a caller profile, an order information, a prior service requests, a customer purchasing pattern, or a purchase/selling power.

In some embodiments, the compatibility score for the individual agents is based on one or more data sets indicative of attributes of the individual agents, the one or more data sets indicative of attributes of the individual agents includes at least one of a technical expertise estimate, an agent profile, prior calls handled by the individual agents, or a purchase/selling power.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

In the following description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

As noted above, routing customer calls to customer care agents using rigid, predetermined routing rules often lead to poor and unsatisfactory customer experience and loss of potential revenue for a company. Thus, and in accordance with some of the embodiments disclosed herein, improved call assignment techniques enable calls to a call center to be assigned to appropriate agents in a way that provides improved caller (e.g., customer) experience and revenue opportunities for the company. The improved caller experience and revenue opportunities are achieved by incorporating attributes of the caller and the individual agents into the agent to call assignment process. Certain attributes can represent the actual characteristics of a human (e.g., a human who is calling the call center and the human agents available to handle the call), while other attributes can represent an artificial persona that represents the human. In any case, the attributes may be used to compute compatibility scores which are representative of human relationship factors and revenue growth opportunities.

In an illustrative embodiment of the present disclosure, a system is programmed or otherwise configured to determine one or more keywords relating to or otherwise indicative of the technical expertise of a caller (e.g., product or service customer) who is calling a call center, and apply a machine learning model to the determined keywords to generate a compatibility index for the caller. The system is also configured to determine one or more keywords relating to or otherwise indicative of the technical expertise of the individual agents who are available to handle the call, and apply the trained machine learning model to the determined keywords to generate a compatibility index for the individual agents. In some such embodiments, the keywords may be determined or otherwise extracted from data sets representative of attributes of the caller and/or the agents, such as, by way of example, technical expertise estimate, caller profile (e.g., caller information such as age, demography, among others), order information, and prior service requests. The system is further configured to generate optimized raw compatibility scores for the caller and the individual agents by optimizing the compatibility indexes to account for external data sets such as customer purchasing pattern data, purchasing/selling power data, and/or other industry benchmark data. The system is also configured to generate compatibility scores for the caller and the individual agents by normalizing the optimized raw compatibility scores to increase (and ideally maximize) caller satisfaction and potential upsell opportunities. The system is also configured assign an available agent to the call (e.g., customer's call) based on a matching of the compatibility scores for the caller and the individual agents. These and other advantages, configurations, modifications, and embodiments will be apparent in light of this disclosure.

Figure 1:
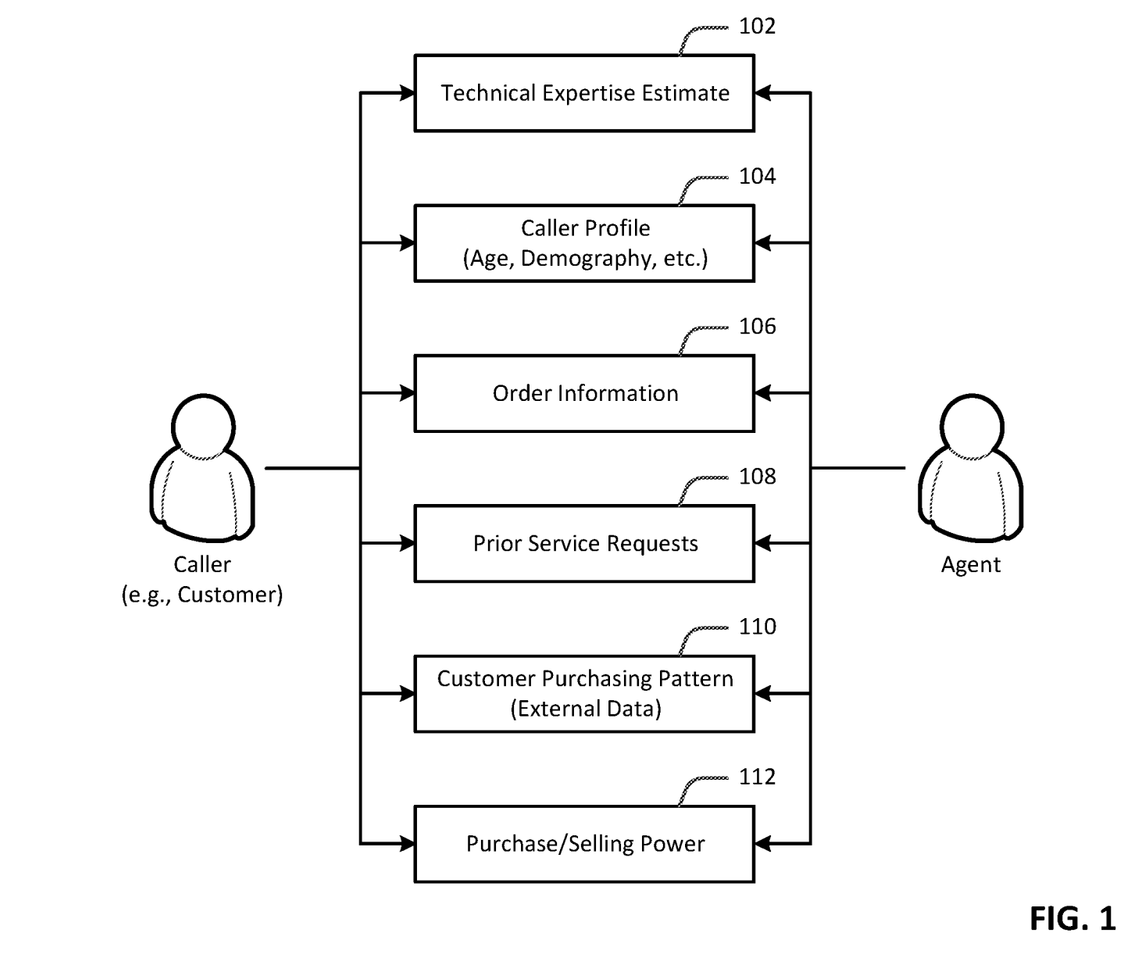
FIG. 1 is a diagram illustrating data sets for computing compatibility scores, in accordance with an embodiment of the present disclosure.

FIG. 1 is a diagram illustrating data sets for computing compatibility scores, in accordance with an embodiment of the present disclosure. The data sets include information indicative of attributes of callers who are calling a call center and agents who are available to handle the calls to the data center. In brief, as will be described in turn further below, such data sets can be understood as enabling the generation of compatibility indexes and compatibility scores for the callers and the individual agents.

As can be seen in FIG. 1, the data sets may include technical expertise estimate 102, a caller profile 104, an order information 106, prior service requests 108, a customer purchasing pattern 110, and a purchase/selling power 112. Note that one or more of the data sets may not apply to the agents who are available to handle the customer call. For instance, caller profile 104 and order information 106 may not include information indicative of attributes of the agent. Also note that some data sets may include information indicative of attributes that represent the actual characteristics of a human, and some data sets may include information indicative of attributes that represent an artificial persona that represents the human. For instance, caller information 104 may include information indicative of attributes of an actual human who is calling the call center. Conversely, customer purchasing pattern 110 may include information indicative of attributes of an artificial persona (e.g., specific age groups, specific education, specific experience, specific locations, etc.) of the human and not the actual human who is calling the call center.

Technical expertise estimate 102 includes information indicative of an estimation of the technical expertise of a caller or an agent. With respect to an agent, technical expertise estimate 102 may include the agent's prior interactions with callers calling the call center, such as, by way of example, voice recordings of prior service calls handled by the agent, written transcripts of prior service calls handled by the agent, caller or customer satisfaction (CSAT) feedback used for reporting caller interactions with the agent, management evaluations and/or ratings for the agent, and other content regarding the agent. Prior agent interactions with callers calling the call center may include information indicative of an estimation of the agent's technical expertise. For example, recordings and transcripts of the agent's prior interactions with callers may include information which indicates that the agent addressed and successfully resolved numerous boot issues for a specific model computing device. As another example, CSAT feedback may include information which indicates that the agent addressed and successfully resolved a remote desktop application configuration and logon issue. As still another example, the management evaluation may include information which indicates that the agent is well qualified to handle hard drive issues on computing devices. Such information regarding the agent may be maintained in an agent profile. As discussed in more detail below, technical expertise estimate 102 may be used, in part, to extract keywords relating to the technical expertise of the agent.

With respect to a caller calling the call center, technical expertise estimate 102 may include information or contents of the current communication or call to the call center. For example, at the beginning or start of the call, the caller may have provided information by responding or otherwise replying to one or more prompts by an Interactive Voice Response (IVR) system or other automated assistant. For example, the prompts may elicit from the caller identifying information, such as, name, account information, product or service information, support contract information, prior service call or service ticket information, and other identifying information. The caller identifying information may be used to identify a previously created caller profile (e.g., caller profile 104) and/or prior service requests made by the caller regarding the same or different product or service issue (e.g., prior service requests 108). The caller identifying information may also provide insights as to the technical expertise of the caller (e.g., the caller may have identified him/herself as a member of an IT department). The product and/or support contract information may be used to identify a product telemetry log or record associated with the support contract (e.g., metrics indicating the usage and health of the computing device, server, storage, and/or networking device under the support contract). As another example, the prompts may elicit from the caller the type of product for which the caller needs assistance with, such as the type of computer hardware or software with which the caller is experiencing a problem or needs other assistance. Information regarding the type of product (e.g., laptop, workstation, server, storage device, application program, etc.) may provide insights as to the technical expertise of the caller. For instance, a caller who is calling with a server issue is likely to be more knowledgeable technically as compared to a caller who is calling with an issue with a laptop computer. As still another example, the words (vocabulary) used by the caller in the communication may provide insights as to the technical expertise of the caller. For instance, a caller who uses technical terms (i.e., technical jargon) to describe the problem/issue or who completely explains the problem/issue the caller is experiencing is likely to be more knowledgeable technically as compared to a caller who uses simple or rudimentary terms to describe the problem/issue or who is unable to completely explain the problem/issue the caller is experiencing. It will be appreciated in light of this disclosure that the prompts at the beginning of a call can elicit from a caller a wide range of information that may be used to determine the attributes of the caller, which may be used in computing or otherwise determining a compatibility score for the caller.

Caller profile 104 may include caller identification data (e.g., name, address, contact information, etc.), caller demographic data (e.g., age, nationality, gender, income, education, employment, etc.), and caller preferences. Information in caller profile 104 may provide insights as to the technical expertise of the caller. For example, a caller having a college education with a post graduate degree in computer engineering is likely to be technically knowledgeable. As another example, a caller who is employed as a software developer at an engineering company is likely to be technically knowledgeable. Caller profile 104 may also include information indicative of the caller's tone that may be generated or otherwise determined from the caller's prior calls and interactions. For example, the tone information may indicate that the caller was impatient and angered during prior calls and interactions. Caller profile 104 may also include information indicative of the caller's usage patterns. For example, caller profile 104 may indicate that the caller is a gamer based on analysis of telemetry data obtained from the caller's product and/or information related to the caller's product purchases. In cases where caller profile 104 is not available or is incomplete for a caller, a generic or default profile may be applied for the caller based on information that is available regarding the caller.

Order information 106 may include information indicative of the way the product or service was purchased. Examples of such information include, but are not limited to, information indicative of how the product or service was purchased, whether full price was paid for the product or service, whether a discount was applied to the purchase price, whether a service agreement was purchased to cover the product or service, whether the product or service was purchased through a third-party, whether the product or service was purchased as part of a package or bundle, among other information. For example, a customer's previous purchases that include or otherwise are associated with support contracts (also known as entitlements) may be indicative of or reflect on the expertise of the customer and used to determine the level of the support assistance the customer is requesting. As an example, a weighted sum of the entitlements and/or purchases may be used or otherwise contribute to determining a compatibility score for the customer (e.g., when the customer calls the call center).

Prior service requests 108 may include dialogs of prior calls and interactions and/or transcriptions of prior calls and interactions (e.g., prior service requests) made by or otherwise associated with the caller. Information in prior service requests 108 may provide insights as to the technical expertise of the caller. For example, prior service requests 108 may include information indicative of the type of product or service that was the subject of the prior calls or interactions and the technical problem or issue with the product or service. Information regarding the type of product (e.g., laptop, workstation, server, storage device, application program, etc.) may provide insights as to the technical expertise of the caller. Information regarding the technical problem or issue (e.g., issue with turning on a computer) may also provide insights as to the technical expertise of the caller. Prior service requests 108 may also include information indicative of the caller's satisfaction level (e.g., very satisfied, satisfied, not satisfied, etc.) in the handling of the problems and issues of the prior calls and interactions. Prior service requests 108 may also include information indicative of the caller's dissatisfaction (DSAT) in the handling of the problems and issues of the prior calls and interactions. For example, the DSAT may refer to a quantified number that represents how unhappy the caller was in how the call was handled (e.g., was the issue resolved during the call, what was the tone of the agent or agents who serviced the call, etc.). Prior service requests 108 may also include other information regarding or otherwise related to the prior calls and interactions such as, for example, identity of the agent(s) who handled the prior call(s), whether the problem or issue was resolved during the call or whether multiple calls were needed to resolve the problem or issue, and whether other products or services were discussed during the call or interaction. For example, with respect to an identified agent, the prior call handling metrics (e.g., repeat calls for the same issue, duration of the calls, poor caller satisfaction, and other operational metrics) may provide insights as to the technical expertise of the agent relative to the other available agents (e.g., other agents who are available to handle a call). As an example, an agent's prior call handling metrics may be applied as penalizing factors (or a weighted average of penalizing factors) in determining a compatibility score for the agent.

Customer purchasing pattern 110 may include information indicative of attributes of an artificial persona (e.g., specific age groups, specific education, specific experience, specific locations, etc.) of the caller and not the actual caller who is calling the call center. For example, customer purchasing pattern 110 may include information indicative of current product and/or service purchasing trends and patterns (e.g., types of products and/or services customers are currently purchasing). The data items may be further categorized based on demographics such as age (e.g., customers in a first age group tend to purchase Product A while customers in a second age group tend to purchase Product B), income level (e.g., customers in a first income range tend to purchase Product C while customers in a second income range tend to purchase Product D), geographic location (e.g., customers located in the Eastern U.S. tend to purchase Product C while customers located in the Western U.S. are not currently purchasing Product C), and education level, to provide a few examples. Such data items in customer purchasing pattern 110 may serve as an external data set. For example, if the information indicates that customers are currently purchasing more laptop computers, the call center can expect more of the service calls to be regarding problems or issues with laptop computers, and the call center may staff more agents having technical expertise in handling problems and issues with laptop computers. This increases the probability that an appropriate agent (e.g., an agent with technical expertise to resolve problems and issues with laptop computers) will be available to handle a service call (e.g., a service call regarding a laptop computer).

Purchase/selling power 112 may include information indicative of the likelihood that the caller is likely to purchase a product or service (i.e., purchasing power of the caller) and/or a type of product or service. For instance, a determination of the caller's purchasing power may be based on an artificial persona of the caller generated using the caller's profile data (e.g., income level, gender, age, education, and other demographic data), data related to usage patterns, and/or the data items in customer purchasing pattern 110. For example, suppose customer purchasing pattern 110 indicates that males between the ages of 30 and 40 years are currently purchasing laptop computers for gaming applications. In this example case, if the caller is a 35-year-old male, a determination may be made that the caller may be likely to purchase a laptop computer appropriate for gaming. This information may be used in determining whether a sales pitch should be made during the call and what product is to be pitched (e.g., upsell opportunity). Such purchase/selling power 112 information regarding the caller may be obtained via social mining (e.g., obtaining data from content on social media sites and mobile applications in order to extract patterns, form conclusions, and act upon the information) for data related to the caller. In some cases, such information may also be obtained from payment processing sites (e.g., VISA, PayPal, etc.). With respect to an agent, purchase/selling power 112 may include information indicative of the likelihood that the agent is likely to be successful in pitching and selling a product or service to the caller.

Figure 2:
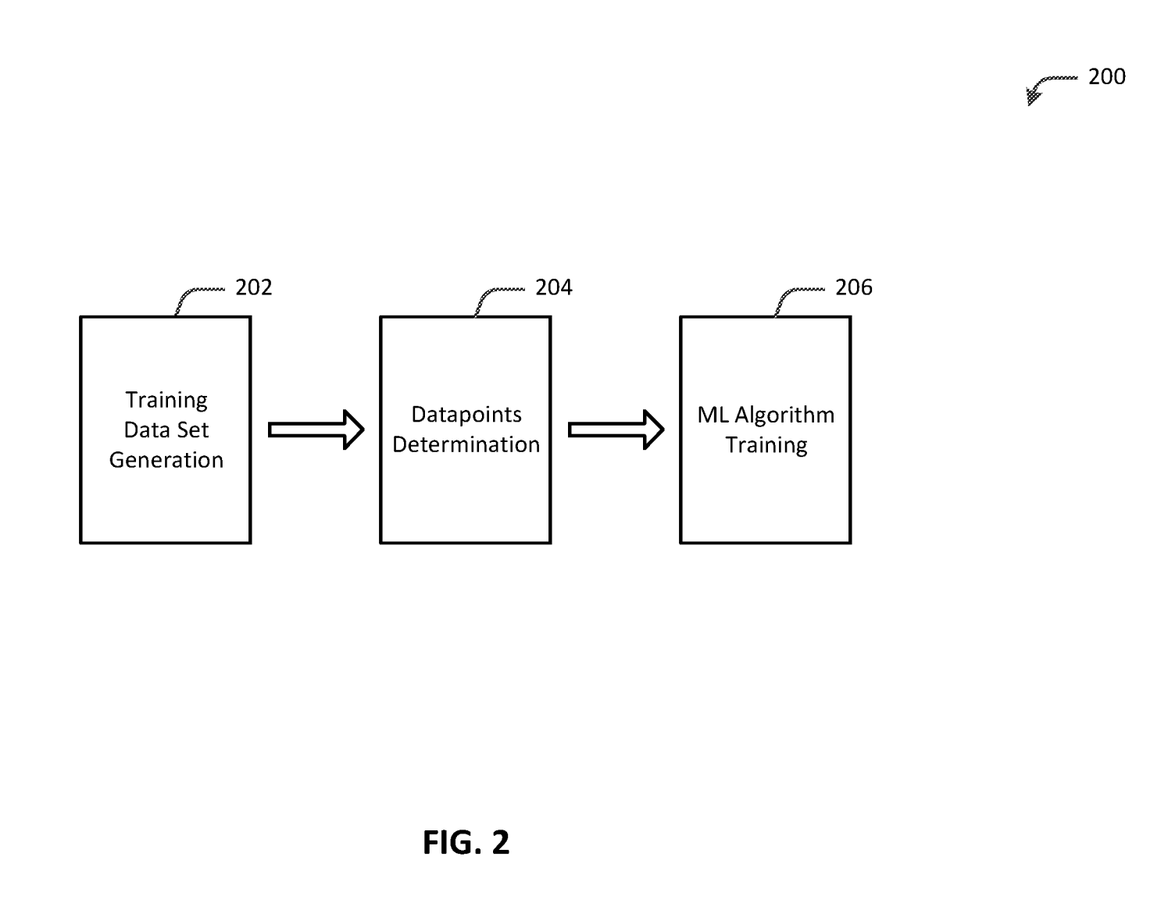
FIG. 2 is a diagram of an illustrative process for training a machine learning model, in accordance with an embodiment of the present disclosure.

FIG. 2 is a diagram of an illustrative process 200 for training a machine learning model, in accordance with an embodiment of the present disclosure. In brief, one or more machine learning (ML) algorithms may be trained using a training data set to create classification groups that are based on a distribution of the training data. Once trained, the trained ML model may be applied to keywords relating to data sets indicative of the attributes of a caller (e.g., technical expertise estimate, caller profile, order information, prior service requests, customer purchasing pattern, purchase/selling power, soft skills, among others) and keywords relating to data sets indicative of the attributes of the individual agents (e.g., technical expertise estimate, agent profile, prior calls handled by the agent, purchase/selling power, soft skills, among others) to map or otherwise classify those keywords to corresponding classification groups. As can be seen in FIG. 2, process 200 includes training data set generation phase 202, a datapoints generation phase 204, and a ML algorithm training phase 206.

Training data set generation phase 202 includes collecting a training data set to use as training data to train one or more ML algorithms to create classification groups based on a distribution of the training data. In some embodiments, the training data set may include a corpus of calls and events recorded for a call center, for example. In some such embodiments, the training data may be recordings (e.g., audio recordings) and/or transcriptions of prior customer calls and events. The training data set may be generated using logs of past customer calls and events. The training data set may also include data from customer profiles, telemetry data captured from customer devices, and data from payment gateways (e.g., financial/purchasing data from payment gateways). In some cases, the training data set may be obtained from commercial or public sources.

Datapoints determination phase 204 includes categorizing and recording the data in the training data set in an identifiable manner. For example, the data may be included or otherwise associated with data categories (e.g., device telemetry data, call log data, financial data from payment gateways, caller persona data, among others), and datapoints in the individual data categories may be identified. Here, a datapoint may refer to a single record in a data set from a specific data category. In some embodiments, the datapoints in the training data may be indicative of the attributes of the callers and agents, such as technical expertise estimate, caller profile, order information, and prior service requests, previously described above.

ML algorithm training phase 206 includes training one or more ML algorithms using the training data set. In some embodiments, the ML algorithm may be an unsupervised clustering algorithm. Non-limiting examples of suitable unsupervised clustering algorithms include K-means clustering, Mean-Shift clustering, and Density-Based Spatial Clustering of Applications with Noise (DBSCAN) clustering, to provide three examples. In such embodiments, the clustering algorithm may be applied to the training data in the training data set. The output of the clustering algorithm may be one or more classification groups that are based on a distribution of the training data. The classification groups may represent a type of caller based on one or more characteristics of callers (e.g., technical expertise or technical level, age or other demographic group, satisfaction level, type of product, support contract, etc.) or a type of agent based on one or more characteristics of agents (e.g., technical expertise of an agent, soft skills, temperament, selling power or ability, etc.). Once trained using the training data set, the trained ML model may be applied to keywords relating to data sets indicative of the attributes of a caller to map or otherwise classify those keywords to corresponding classification groups. The trained ML model may be also applied to keywords relating to data sets indicative of the attributes of the individual agents to map or otherwise classify those keywords to corresponding classification groups. In some embodiments, data labelling may be utilized in generating the classification groups. In the context of machine learning, data labelling includes the process of detecting and tagging (or labeling) data samples (e.g., data points). In some embodiments, active learning may be utilized in generating the classification groups. Active learning is a case of machine learning in which a learning algorithm can interactively query an information source (e.g., a user) to tag (or label) the data points with the desired outputs.

Figure 3:
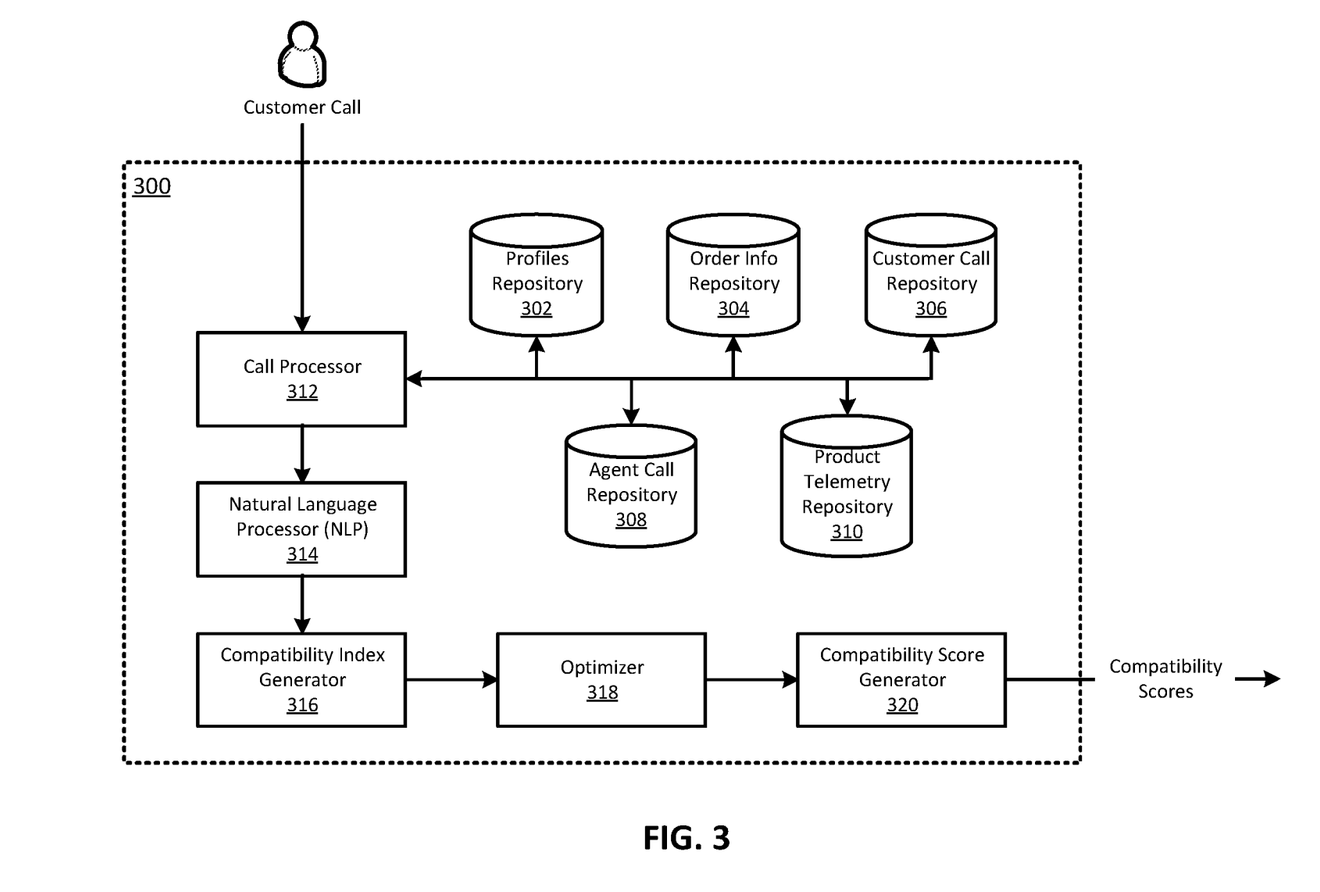
FIG. 3 is a block diagram of an illustrative system that can be used to generate compatibility scores, in accordance with an embodiment of the present disclosure.

FIG. 3 is a block diagram of an illustrative system 300 that can be used to compute compatibility scores, in accordance with an embodiment of the present disclosure. System 300 may be implemented in whole or in part using any suitable hardware, or combination of hardware and software, including without limitation the computer system illustrated in FIG. 6. In embodiments, system 300 may be deployed to process incoming calls (e.g., customer calls) to a call center and, for the individual incoming calls, compute a compatibility score for a caller making the call and a compatibility score for the individual agents available to handle the incoming call.

As can be seen in FIG. 3, system 300 includes a profiles repository 302, an order information repository 304, a customer call repository 306, an agent call repository 308, and a product telemetry repository 310. Repositories 302, 304, 306, 308, 310 may be implemented using any computer-readable storage media suitable for carrying or having data or data structures stored thereon. One or more of repositories 302, 304, 306, 308, 310 may be provided on system 300 or provided separately or remotely from system 300.

Profiles repository 302 may be configured to store caller profile records and agent profile records. A caller profile record may include data regarding a caller such as, for example, caller identification data (e.g., name, address, contact information, etc.), caller demographic data (e.g., age, nationality, gender, income, education, employment, etc.), prior interaction data (e.g., prior service requests made by or otherwise associated with the caller), caller preferences, and other information regarding the caller. A caller profile record may also include caller affiliation data. For example, a caller may be a member of an IT department of an organization calling regarding a problem or issue with a product purchased by the organization (e.g., the customer). In this example case, the caller's caller profile may include information indicative of the caller's association with the organization and the capacity in which the caller is calling the call center. In some embodiments, a caller profile record may include data substantially similar to the data included in caller profile 104 described above in the context of FIG. 1.

Still referring to profiles repository 302, an agent profile record may include data regarding an agent such as, for example, agent identification data (e.g., identification number, name, etc.), agent demographic data (e.g., age, nationality, gender, physical location, etc.), language skills, areas of expertise, performance rating data which may be based on management evaluations and/or customer satisfaction feedback, information regarding the agent's soft skills (e.g., people skills, social skills, communications skills, character or personality traits, emotional traits, etc.), and other information regarding the agent. In some embodiments, an agent profile record for an agent may also include a temperament rating (e.g., patient, impatient, fast, irritable, relaxed, etc.) for the agent. In such embodiments, the soft skill information and/or the temperament rating may be generated or determined by analyzing the agent's prior calls or samples from the prior calls using machine learning algorithms.

Order information repository 304 may be configured to store product/service order information records pertaining to the purchase of products and services. A product/service order information record may include data regarding a purchase of a product or service such as, for example, manner in which the product/service was purchased, whether full price was paid for the product/service, whether a discount was applied to the purchase price, whether a service agreement was purchased to cover the product/service, whether the product/service was purchased through a third-party, whether the product/service was purchased as part of a package or bundle, and other product/service purchase information.

Customer call repository 306 may be configured to store records pertaining to calls made by customers to the call center. A customer call record may include data regarding a customer call such as, for example, identity of the customer, identity of the caller making the call (e.g., the caller may be different than the customer), identity of the agent who handled the call, time of the call, duration of the call, direction of the call (e.g., inbound call or outbound call), type of call, technical problem/issue, caller's satisfaction level (e.g., very satisfied, satisfied, not satisfied, etc.), whether the problem/issue was resolved during the call, recording and/or transcription of the call or location of the recording and/or transcription of the call, and other information regarding the call.

Agent call repository 308 may be configured to store records pertaining to calls handled by the agents associated with the call center. An agent call record for a call handled by an agent may include data substantially similar to the data included in a customer call record described above.

Product telemetry repository 310 may be configured to store records pertaining to telemetry data from products and devices, such as smart products and devices, associated with the call center. For example, a product may include a proactive support software or application that sends or otherwise provides telemetry data to a product support provider, such as a company that manufactured or sold the product. A telemetry record may include telemetry data from a product such as, for example, identity of the product, product load and availability, disk space usage, memory consumption, performance, potential security breaches, and other product usage and health metrics.

With continued reference to FIG. 3, system 300 is programmed or otherwise includes components and/or modules configured to compute a compatibility score for a caller calling the call center and a compatibility score for the individual agents available to handle the incoming call. To this end, and in accordance with an embodiment of the present disclosure, system 300 includes a call processor 312, a natural language processor (NLP) 314, a compatibility index generator 316, an optimizer 318, and a compatibility score generator 320.

Call processor 312 may be configured to receive one or more inputs from a call to the call center. The inputs may include the contents (e.g., natural language content, responses to prompts, etc.) of the current call to the call center. The content may be in voice (e.g., phone call) or text (e.g., instant messaging) modalities. Call processor 312 may use the inputs from the call to determine additional data sets which may be indicative of attributes of the caller. As an example, the data sets may include a caller profile record if such a record was created for the caller, a product/service order information record associated with the product or service for which the caller needs assistance with, records of prior calls made by the caller if the caller previously called the call center, records of prior calls pertaining to the product or service if prior calls were made regarding the problem or issue, and telemetry records associated with the product. Call processor 312 may then send or otherwise provide the inputs from the call and the data sets associated with the call to natural language processor 314 for processing, including the extraction of keywords from the data sets.

Natural language processor 314 may be configured to extract keywords from the inputs from the call and the data sets associated with the call using natural language processing provided by call processor 312. In brief, natural language processor 314 pre-processes the contents of the inputs from the call and the data sets associated with the call to transform the content to a predictable and analyzable form for extracting keywords. In some embodiments, the keywords may relate to or otherwise be indicative of attributes of the caller (e.g., technical expertise estimate, caller profile, order information, prior service requests, customer purchasing pattern, purchase/selling power, soft skills, and emotional aspects). Once trained, the trained ML model may be applied to keywords relating to data sets indicative of the attributes of a caller (e.g., technical expertise estimate, caller profile, order information, prior service requests, customer purchasing pattern, purchase/selling power, soft skills, among others) and keywords relating to data sets indicative of the attributes of the individual agents (e.g., technical expertise estimate, agent profile, prior calls handled by the agent, purchase/selling power, soft skills, among others) to map or otherwise classify those keywords to corresponding classification groups.

Natural language processor 314 is also configured to determine the agents who are available to handle the call and determine data sets which may be indicative of attributes of the individual available agents. As an example, the data sets for an available agent may include an agent profile record created for the agent and records of prior calls handled by the agent. Natural language processor 314 can then extract keywords from the data sets associated with the available agents using natural language processing. Similar to the keyword extraction for the caller, the keywords may relate to or otherwise be indicative of attributes of the individual available agents (e.g., technical expertise estimate, agent profile, prior calls handled by the agent, purchase/selling power, soft skills, and emotional aspects). The operation of natural language processor 314 is further described below at least with respect to FIG. 4. Upon extracting the keywords (i.e., the keywords associated with the caller and the keywords associated with the individual available agents), natural language processor 314 may send or otherwise provide the extracted keywords to compatibility index generator 316.

Compatibility index generator 316 may be configured to generate a compatibility index for the caller and the individual available agents based on the keywords provided by natural language processor 314. The compatibility indexes may serve as an initial measure of human relationship capabilities of the caller and the individual available agents since these indexes are generated based on keywords relating to attributes of the caller and the individual available agents. In an illustrative embodiment, compatibility index generator 316 may apply the trained ML model described above with respect to FIG. 2 (e.g., the clustering algorithm trained using datapoints indicative of the attributes of the callers and agents of prior customer calls and events) to the keywords. Through application of the trained ML model, compatibility index generator 316 maps or otherwise classifies the keywords associated with the caller to corresponding classification groups and generates a compatibility index (e.g., compatibility index score) for the caller. Similarly, compatibility index generator 316 applies the trained ML model to map or otherwise classify the keywords associated with the individual available agents to corresponding classification groups and generate a compatibility index (e.g., compatibility index score) for the individual available agents. In some embodiments, a compatibility index (e.g., compatibility index score) for the caller and the individual available agents may be a weighted average of the individual indexes generated for the different data sets (e.g., technical expertise estimate, caller profile, agent profile, order information, prior service requests, etc.). Upon generating the compatibility indexes (e.g., the compatibility index scores) for the caller and the individual available agents, compatibility index generator 316 may send or otherwise provide the generated compatibility indexes to optimizer 318.

Optimizer 318 may be configured to optimize the compatibility indexes for the caller and the individual available agents to account for external data sets. The external data sets may include customer purchasing pattern data (e.g., customer purchasing pattern 110), purchasing/selling power data (e.g., purchase/selling power 112), and/or other industry benchmark data relating to the caller and the individual available agents. Optimizing a compatibility index by leveraging such external data sets generates an optimized raw compatibility score (i.e., an enhanced compatibility index) that also accounts for attributes that represent an artificial persona of the caller or the individual available agents. In an illustrative embodiment, optimizer 318 may leverage a cost function that captures the interrelationship between DSAT and industry benchmarks of purchasing patterns. This cost function may be solved to reduce (and ideally minimize) DSAT, keeping in mind the purchasing ability of the caller (i.e., the customer). The cost function may be applied to the compatibility index for the caller and the compatibility index for the individual available agents to generate normalized values for the optimized raw compatibility scores. Upon optimizing the compatibility indexes for the caller and the individual available agents, optimizer 318 may send or otherwise provide the optimized raw compatibility scores (i.e., the normalized values) to compatibility score generator 320.

Compatibility score generator 320 may be configured to generate compatibility scores for the caller and the individual available agents by normalizing the optimized raw compatibility scores to increase (and ideally maximize) caller satisfaction (e.g., customer satisfaction) and potential revenue generating opportunity with the caller (e.g., potential upsell opportunities for the company). For instance, it may be the case that caller satisfaction is maximized if the problem or issue is satisfactorily handled during the call. In an illustrative embodiment, compatibility score generator 320 may increase (and ideally maximize) caller satisfaction and potential revenue generating opportunity with the caller using the following cost function (also known as fitness function or objective function):

$$f(x) = x + \Sigma_0^n \text{Optimized(Computed Raw Score)} * (f1 + f2) \quad [1]$$

where:
x is the external data (e.g., the external data sets, such as customer purchasing pattern, caller purchasing power, industry benchmark data—e.g., industry benchmarks to troubleshoot an issue, etc.),
n is the data category/score,
Optimized (Computed Raw Score) is the output from the machine learning model,
f1 is the caller satisfaction (e.g., CSAT), and
f2 is the potential revenue generating opportunities (e.g., potential upsell opportunities).

The cost function [1] may be solved to increase (and ideally maximize) caller satisfaction and potential revenue generating opportunity. In some embodiments, the compatibility scores generated by solving the cost function (e.g., individual compatibility scores ranging from '0' to '10') may be used to assign an available agent to the call. For instance, in an illustrative implementation, an available agent having a compatibility score that matches (or is closest to) the caller's compatibility score may be assigned to the call.

It is appreciated that the availability of agents having potential matching compatibility scores (i.e., compatibility scores that matches a caller's compatibility score) may not be unlimited. For instance, it may be the case that the best agent to handle a call (i.e., an available agent having a compatibility score that matches or is closest to the caller's compatibility score) is assigned to another call and, thus, is no longer available to handle the call. In other words, the best agent who was available to handle a call was assigned to another call before the agent could be assigned to this call. To account for such cases, the available agents may be assigned to incoming calls in a manner as to increase the chances of matching more incoming calls with available agents who have matching compatibility scores. In other words, available agents may be assigned to incoming calls in a manner as to account for the possibility that the best agent may not be available for a specific incoming call. To this end, in some embodiments, system 300 may optionally apply a variation of the dining philosopher's problem to the generated compatibility scores to assign an available agent to an incoming call. As an example, suppose there are currently 10 callers, each having a compatibility score of four (4), waiting to be assigned to an agent, and only one available agent having a compatibility score of four (4). In this example case, the dining philosopher's problem may be applied to determine an assignment of the one available agent having a compatibility score of four (4) to one or the waiting callers having a compatibility score of four (4) and, once this agent is done with the call, reassigning this agent to another of the waiting callers having a compatibility score of four (4), and so one. In some cases, the assignment and reassignment of the agent may be based on an ordering of the 10 callers (i.e., 10 callers each having a compatibility score of four (4)) waiting to be assigned to an agent. In some cases, the assignment and reassignment of the agent may be performed in a round robin fashion.

Figure 4:
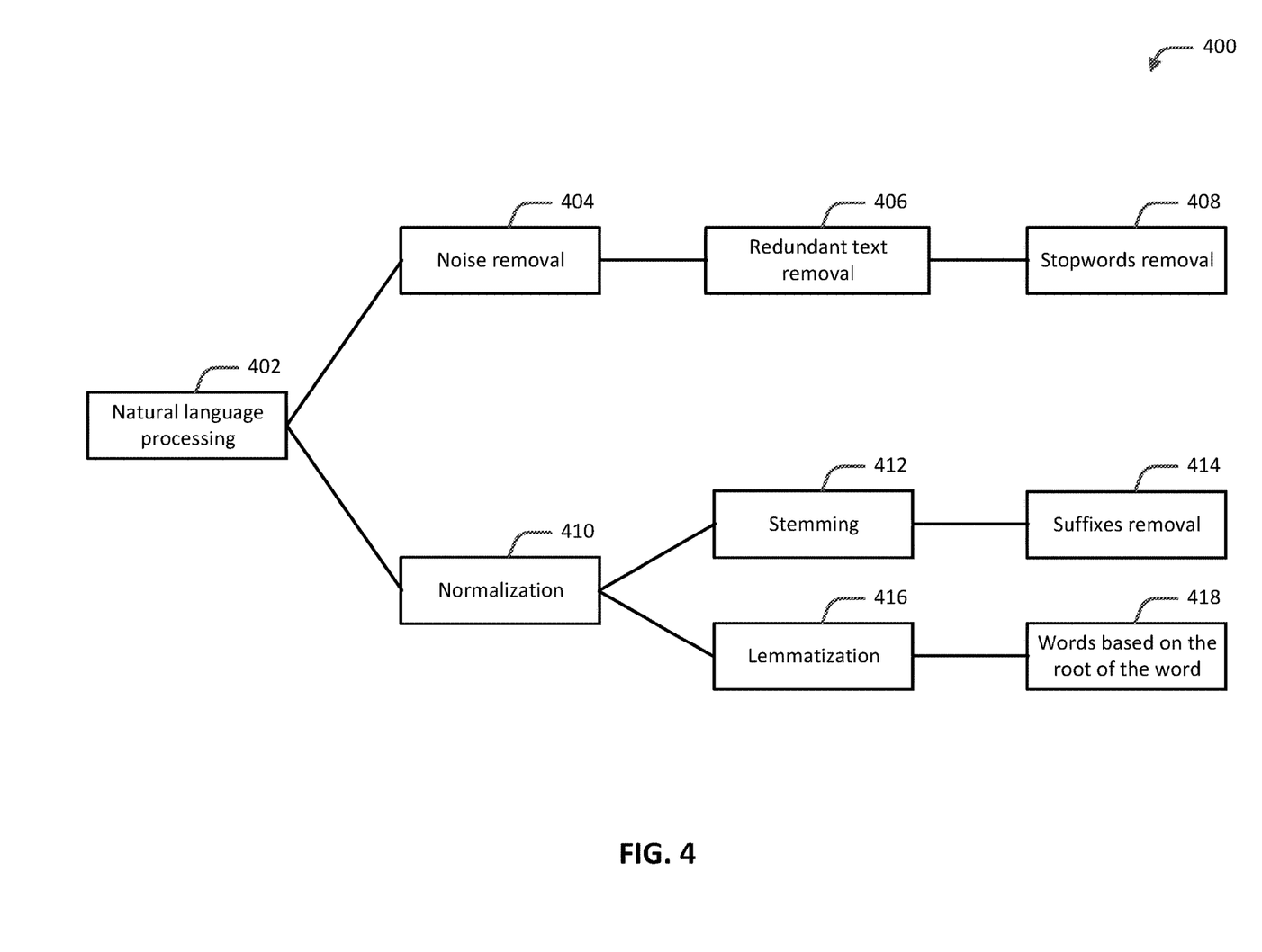
FIG. 4 is a diagram of illustrative processes that perform natural language processing to extract keywords, in accordance with an embodiment of the present disclosure.

FIG. 4 is a diagram of illustrative processes that perform natural language processing to extract keywords, in accordance with an embodiment of the present disclosure. The processes may include natural language processing 402, noise removal 404, redundant text removal 406, stopwords removal 408, normalization 410, stemming 412, suffixes removal 414, lemmatization 416, and words based on the root of the word 418. While some or all of these processes 402-418 may be known in the prior art, their use with system 200 (and, in particular, natural language processor 312) are new, and are described below with attention paid to their use in this connection. It is appreciated that natural language processing may be performed using less than all of these processes, and that the processes may be performed in a different order. Additionally or alternatively, two or more of the processes may be performed at the same time or otherwise in an overlapping contemporaneous fashion. Thus, the processes 402-408 of FIG. 4 is illustrative only, and not limiting.

Natural language processing 402 includes pre-processing the input data to transform the input data to a predictable and analyzable form for extracting keywords. In the case of a caller, the input data may include the contents of the inputs from the call and the data sets associated with the call. In the case of the available agents, the input data may include the contents of an agent profile record created for an individual agent and records of prior calls handled by the individual agent. The extracted keywords may relate to or otherwise be indicative of attributes of the caller and attributes of the individual agents. For example, with respect to technical expertise or technical level, non-limiting examples of keywords include name of the operating system at issue, the version of the operating system at issue, device configuration type, device model, and words related to or descriptive of the issue.

Noise removal 404 includes the process of cleaning up the text (e.g., removing whitespaces, characters, digits, and items of text) in the input data which can interfere with the extraction of keywords from the input data.

Redundant text removal 406 includes the process of detecting and removing redundant or repeated text (e.g., words) from the input data. Similar to stopwords, redundant or repeated text (i.e., repeated occurrences of the same text) may be removed from the input data as they are unlikely to provide any valuable information for downstream analysis (e.g., keyword extraction and classification).

Stopwords removal 408 includes the process of detecting and removing stopwords from the input data. Stopwords are commonly occurring words in a language (e.g., "the", "a", "is", "are", "we", and so on). These stopwords may be removed from the input data as these stopwords are unlikely to provide any valuable information for downstream analysis (e.g., keyword extraction and classification). Stopwords removal 408 may also include the process of detecting and removing HTML, tags, Uniform Resource Locators (URLs), and punctuation from the input data since, similar to stopwords, HTML tags, URLs, and punctuation are unlikely to provide any valuable information for downstream analysis.

Normalization 410 includes the process of converting a text to a standard (or canonical) format. Normalization 410 is useful in preparing the input data for downstream processing. For example, numbers (e.g., $200.00) may be converted to their word form (e.g., "two hundred dollars"). As another example, misspelled words (e.g., "goood") may be corrected to their canonical form (e.g., "good"). As still another example, all characters may be converted to a single case (e.g., lower case) to simplify the searching process.

Stemming 412 includes the process of detecting and reducing inflected words (e.g., "walked", "walks") in the input data to their word stem, base, or root form (e.g., "walk"). As another example, the inflected words "console" and "consoling" may be reduced to the root form "consol". Note that the "root" in this example case may not be a real root word, but just a canonical form of the original word.

Suffixes removal 414 includes the process of detecting words having suffixes and removing or stripping the suffixes from these words. In some respects, suffix removal 414 may be similar to stemming 412.

Lemmatization 416 includes the process of determining a word's lemma or dictionary form from its context within a sentence. For example, the inflected words "drive", "deriving", "drives", "driven", or "drove" may be mapped to the word "drive". Lemmatization 416 may be distinguished from stemming 412, which performs a similar task without knowledge of the word's part of speech.

Words based on the root of the word 418 includes the process of determining the root words. In some respects, words based on the root of the word 418 may be similar to lemmatization 416.

Figure 5:
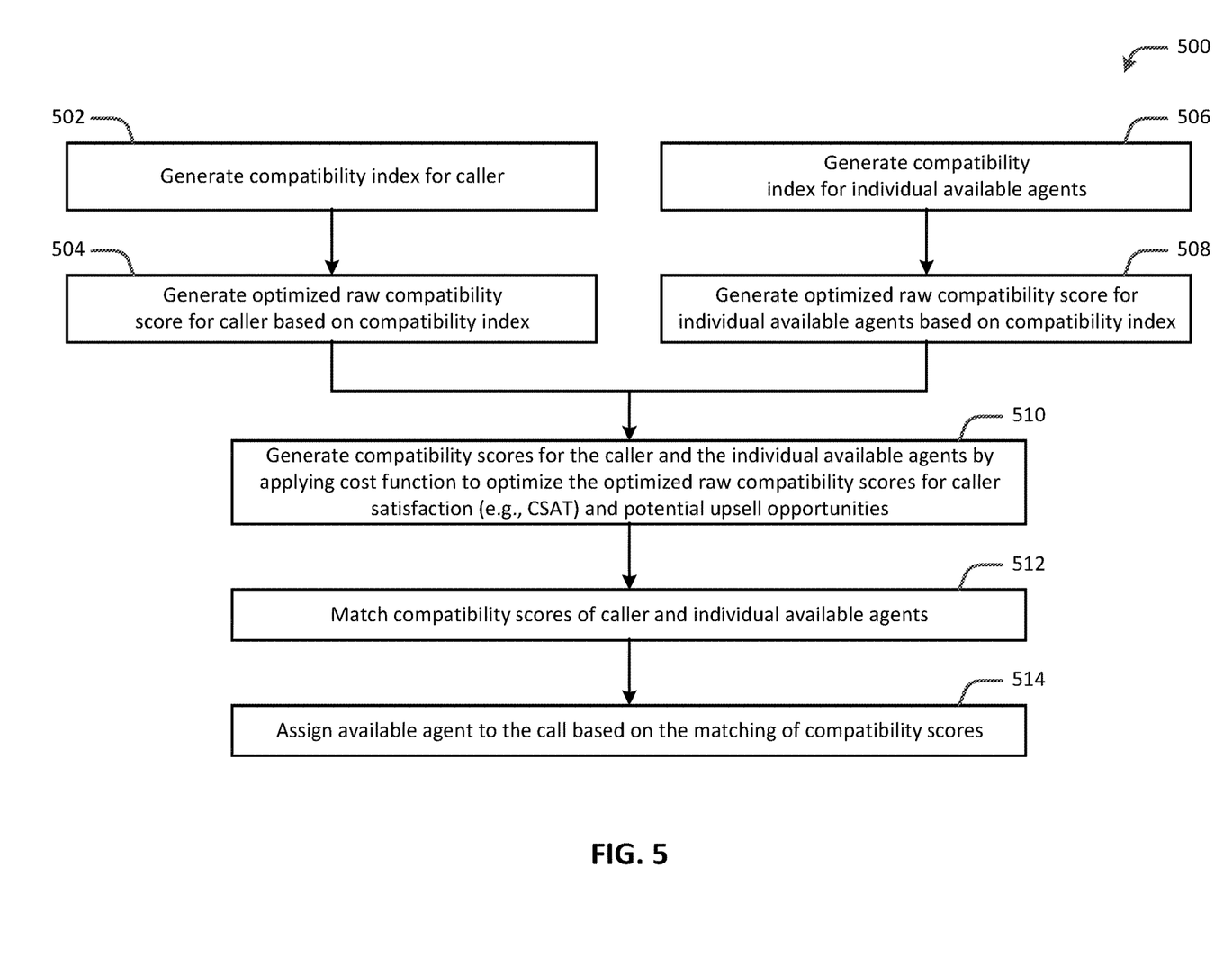
FIG. 5 is a flow diagram of an illustrative process for assigning an agent to a caller based on a matching of compatibility scores, in accordance with an embodiment of the present disclosure.

FIG. 5 is a flow diagram of an illustrative process 500 for assigning an agent to a caller based on a matching of compatibility scores, in accordance with an embodiment of the present disclosure. Process 500 may be implemented or performed by any suitable hardware, or combination of hardware and software, including without limitation the system shown and described with respect to FIG. 3, the computer system shown and described with respect to FIG. 6, or a combination thereof. For example, in some embodiments, the operations, functions, or actions illustrated in process 500 may be performed, for example, in whole or in part by call processor 312, natural language processor 314, compatibility index generator 316, optimizer 318, compatibility score generator 320, or any combination of these including other components of system 300 described with respect to FIG. 3.

With reference to process 500 of FIG. 5, and in an illustrative scenario, an incoming call may be received at a call center provided by a company, and call processor 312 may receive and use the inputs of the call to determine data sets indicative of attributes of a caller (i.e., the caller making the incoming call) and the individual agents available to handle the incoming call. At 502, compatibility index generator 316 may generate a compatibility index for the caller based on keywords indicative of attributes of the caller. These keywords may be provided by natural language processor 314. For example, the compatibility index may be based on a mapping of the keywords associated with the caller to corresponding classification groups. With respect to the caller, the classification groups may represent a type of caller based on one or more characteristics of the caller (e.g., technical expertise or technical level, age or other demographic group, satisfaction level, type of product, support contract, etc.). At 504, optimizer 318 may generate an optimized raw compatibility score for the caller based on the caller's compatibility index. For example, the optimized raw compatibility score for the caller may be generated by optimizing the caller's compatibility index to account for external data sets such as customer purchasing pattern data (e.g., customer purchasing pattern 110), purchasing/selling power data (e.g., purchase/selling power 112), and/or other industry benchmark data relating to the caller.

At 506, compatibility index generator 316 may generate a compatibility index for the individual available agents based on keywords indicative of attributes of the individual available agents. These keywords may be provided by natural language processor 314. For example, the compatibility index may be based on a mapping of the keywords associated with the individual available agents to corresponding classification groups. With respect to the individual available agents, the classification groups may represent a type of agent based on one or more characteristics of the agent (e.g., technical expertise of an agent, soft skills, temperament, selling power or ability, etc.). At 508, optimizer 318 may generate an optimized raw compatibility score for the individual available agents based on the individual available agent's compatibility index. For example, the optimized raw compatibility score for the individual available agents may be generated by optimizing the individual available agent's compatibility index to account for external data sets such as purchasing/selling power data (e.g., purchase/selling power 112) and/or other industry benchmark data relating to the individual available agents.

Upon generating the optimized raw compatibility scores for the caller and the individual available agents, at 510, compatibility score generator 320 may generate compatibility scores for the caller and the individual available agents by applying a cost function to optimize the optimized raw compatibility scores for caller satisfaction (e.g., CSAT) and potential upsell opportunities for the company. At 512, system 300 may match the compatibility score for the caller and the compatibility score for the individual available agents. For example, system 300 may match the compatibility scores to identify a compatibility score of an available agent that matches or is closest to the compatibility score of the caller. At 514, system 300 may assign an available agent to the call based on the matching of compatibility scores. For example, system 300 may assign an available agent having a compatibility score that matches the compatibility score of the caller to the call. In the case where there are no matching compatibility scores, system 300 may assign an available agent having a compatibility score that is closest to the compatibility score of the caller to the call.

Figure 6:
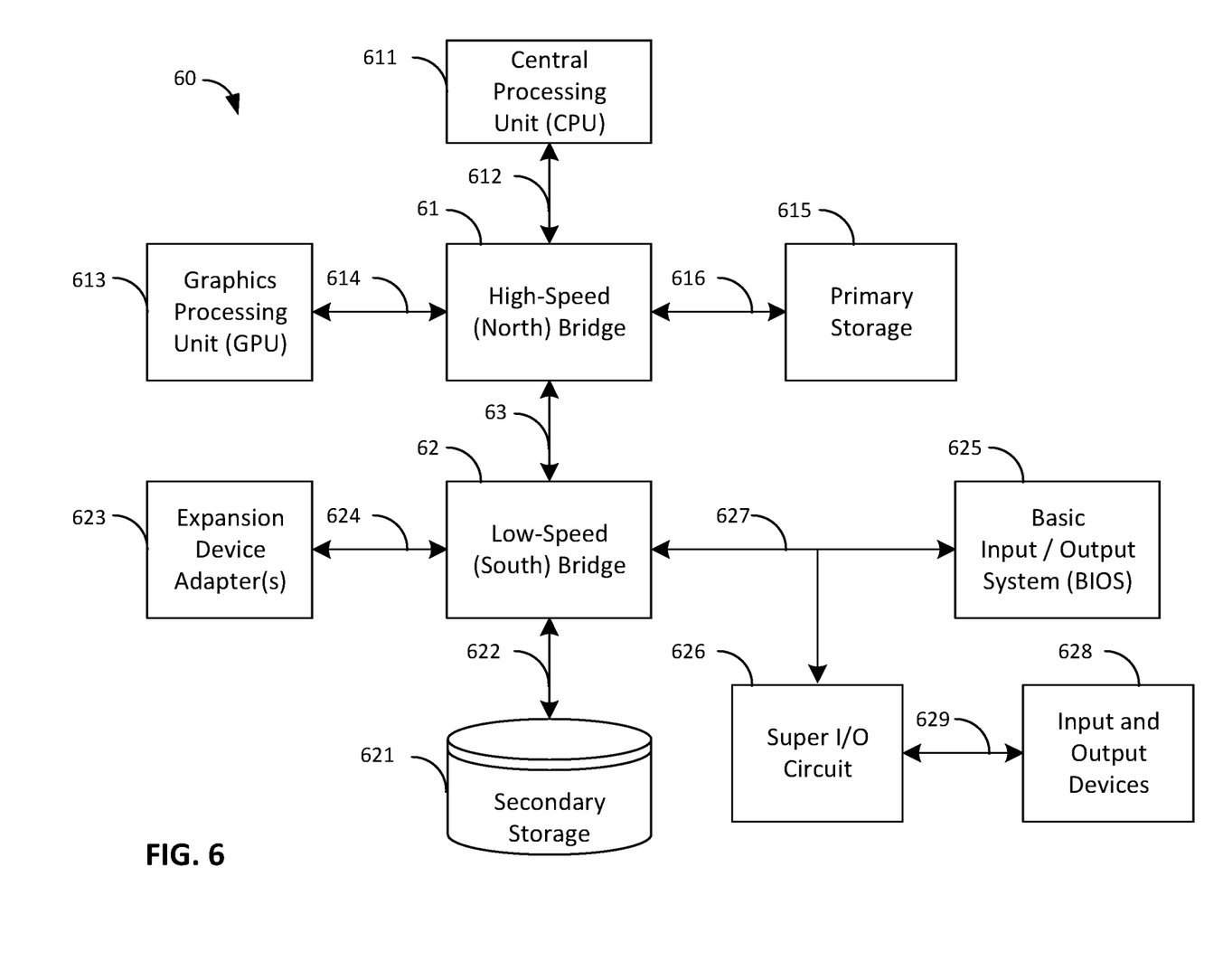
FIG. 6 schematically shows relevant physical components of a computer system that may be used in accordance with an embodiment of the concepts, structures, and techniques disclosed herein.

FIG. 6 schematically shows relevant physical components of a computer system 60 that may be used in accordance with an embodiment of the concepts, structures, and techniques disclosed herein. Generally, computer system 60 has many functional components that communicate data with each other using data buses. The functional components of FIG. 6 are physically arranged based on the speed at which each must operate, and the technology used to communicate data using buses at the necessary speeds to permit such operation.

Thus, computer system 60 is arranged as high-speed components and buses 611 to 616 and low-speed components and buses 621 to 629. High-speed components and buses 611 to 616 are coupled for data communication using a high-speed bridge 61, also called a "northbridge," while low-speed components and buses 621 to 629 are coupled using a low-speed bridge 62, also called a "southbridge."

Computer system 60 includes a central processing unit ("CPU") 611 coupled to high-speed bridge 61 via a bus 612. CPU 611 is electronic circuitry that carries out the instructions of a computer program. As is known in the art, CPU 611 may be implemented as a microprocessor; that is, as an integrated circuit ("IC"; also called a "chip" or "microchip"). In some embodiments, CPU 611 may be implemented as a microcontroller for embedded applications, or according to other embodiments known in the art.

Bus 612 may be implemented using any technology known in the art for interconnection of CPUs (or more particularly, of microprocessors). For example, bus 612 may be implemented using the HyperTransport architecture developed initially by AMD, the Intel QuickPath Interconnect ("QPI"), or a similar technology. In some embodiments, the functions of high-speed bridge 61 may be implemented in whole or in part by CPU 611, obviating the need for bus 612.

Computer system 60 includes one or more graphics processing units (GPUs) 613 coupled to high-speed bridge 61 via a graphics bus 614. Each GPU 613 is designed to process commands from CPU 611 into image data for display on a display screen (not shown). In some embodiments, CPU 611 performs graphics processing directly, obviating the need for a separate GPU 613 and graphics bus 614. In other embodiments, GPU 613 is physically embodied as an integrated circuit separate from CPU 611 and may be physically detachable from computer system 60 if embodied on an expansion card, such as a video card. GPU 613 may store image data (or other data, if GPU 613 is used as an auxiliary computing processor) in a graphics buffer.

Graphics bus 614 may be implemented using any technology known in the art for data communication between a CPU and a GPU. For example, graphics bus 614 may be implemented using the Peripheral Component Interconnect Express ("PCI Express" or "PCIe") standard, or a similar technology.

Computer system 60 includes a primary storage 615 coupled to high-speed bridge 61 via a memory bus 616. Primary storage 615, which may be called "main memory" or simply "memory" herein, includes computer program instructions, data, or both, for use by CPU 611. Primary storage 615 may include random-access memory ("RAM"). RAM is "volatile" if its data are lost when power is removed, and "non-volatile" if its data are retained without applied power. Typically, volatile RAM is used when computer system 60 is "awake" and executing a program, and when computer system 60 is temporarily "asleep", while non-volatile RAM ("NVRAM") is used when computer system 60 is "hibernating"; however, embodiments may vary. Volatile RAM may be, for example, dynamic ("DRAM"), synchronous ("SDRAM"), and double-data rate ("DDR SDRAM"). Non-volatile RAM may be, for example, solid-state flash memory. RAM may be physically provided as one or more dual in-line memory modules ("DIMMs"), or other, similar technology known in the art.

Memory bus 616 may be implemented using any technology known in the art for data communication between a CPU and a primary storage. Memory bus 616 may comprise an address bus for electrically indicating a storage address, and a data bus for transmitting program instructions and data to, and receiving them from, primary storage 615. For example, if data are stored and retrieved 64 bits (eight bytes) at a time, then the data bus has a width of 64 bits. Continuing this example, if the address bus has a width of 32 bits, then $2^{32}$ memory addresses are accessible, so computer system 60 may use up to $8*2^{32}=32$ gigabytes (GB) of primary storage 615. In this example, memory bus 616 will have a total width of 64+32=96 bits. Computer system 60 also may include a memory controller circuit (not shown) that converts electrical signals received from memory bus 616 to electrical signals expected by physical pins in primary storage 615, and vice versa.

Computer memory may be hierarchically organized based on a tradeoff between memory response time and memory size, so depictions and references herein to types of memory as being in certain physical locations are for illustration only. Thus, some embodiments (e.g. embedded systems) provide CPU 611, graphics processing units 613, primary storage 615, and high-speed bridge 61, or any combination thereof, as a single integrated circuit. In such embodiments, buses 612, 614, 616 may form part of the same integrated circuit and need not be physically separate. Other designs for computer system 60 may embody the functions of CPU 611, graphics processing units 613, and primary storage 615 in different configurations, obviating the need for one or more of buses 612, 614, 616.

The depiction of high-speed bridge 61 coupled to CPU 611, GPU 613, and primary storage 615 is merely exemplary, as other components may be coupled for communication with high-speed bridge 61. For example, a network interface controller ("NIC" or "network adapter") may be coupled to high-speed bridge 61, for transmitting and receiving data using a data channel. The NIC may store data to be transmitted to, and received from, the data channel in a network data buffer.

High-speed bridge 61 is coupled for data communication with low-speed bridge 62 using an internal data bus 73. Control circuitry (not shown) may be required for transmitting and receiving data at different speeds. Internal data bus 73 may be implemented using the Intel Direct Media Interface ("DMI") or a similar technology.

Computer system 60 includes a secondary storage 621 coupled to low-speed bridge 62 via a storage bus 622. Secondary storage 621, which may be called "auxiliary memory", "auxiliary storage", or "external memory" herein, stores program instructions and data for access at relatively low speeds and over relatively long durations. Since such durations may include removal of power from computer system 60, secondary storage 621 may include non-volatile memory (which may or may not be randomly accessible).

Non-volatile memory may comprise solid-state memory having no moving parts, for example a flash drive or solid-state drive. Alternately, non-volatile memory may comprise a moving disc or tape for storing data and an apparatus for reading (and possibly writing) the data. Data may be stored (and possibly rewritten) optically, for example on a compact disc ("CD"), digital video disc ("DVD"), or Blu-ray disc ("BD"), or magnetically, for example on a disc in a hard disk drive ("HDD") or a floppy disk, or on a digital audio tape ("DAT"). Non-volatile memory may be, for example, read-only ("ROM"), write-once read-many ("WORM"), programmable ("PROM"), erasable ("EPROM"), or electrically erasable ("EEPROM").

Storage bus 622 may be implemented using any technology known in the art for data communication between a CPU and a secondary storage and may include a host adaptor (not shown) for adapting electrical signals from low-speed bridge 62 to a format expected by physical pins on secondary storage 621, and vice versa. For example, storage bus 622 may use a Universal Serial Bus ("USB") standard; a Serial AT Attachment ("SATA") standard; a Parallel AT Attachment ("PATA") standard such as Integrated Drive Electronics ("IDE"), Enhanced IDE ("EIDE"), ATA Packet Interface ("ATAPI"), or Ultra ATA; a Small Computer System Interface ("SCSI") standard; or a similar technology.

Computer system 60 also includes one or more expansion device adapters 623 coupled to low-speed bridge 62 via a respective one or more expansion buses 624. Each expansion device adapter 623 permits computer system 60 to communicate with expansion devices (not shown) that provide additional functionality. Such additional functionality may be provided on a separate, removable expansion card, for example an additional graphics card, network card, host adaptor, or specialized processing card.

Each expansion bus 624 may be implemented using any technology known in the art for data communication between a CPU and an expansion device adapter. For example, expansion bus 624 may transmit and receive electrical signals using a Peripheral Component Interconnect ("PCI") standard, a data networking standard such as an Ethernet standard, or a similar technology.

Computer system 60 includes a basic input/output system ("BIOS") 625 and a Super I/O circuit 626 coupled to low-speed bridge 62 via a bus 627. BIOS 625 is a non-volatile memory used to initialize the hardware of computer system 60 during the power-on process. Super I/O circuit 626 is an integrated circuit that combines input and output ("I/O") interfaces for low-speed input and output devices 628, such as a serial mouse and a keyboard. In some embodiments, BIOS functionality is incorporated in Super I/O circuit 626 directly, obviating the need for a separate BIOS 625.

Bus 627 may be implemented using any technology known in the art for data communication between a CPU, a BIOS (if present), and a Super I/O circuit. For example, bus 627 may be implemented using a Low Pin Count ("LPC") bus, an Industry Standard Architecture ("ISA") bus, or similar technology. Super I/O circuit 626 is coupled to I/O devices 628 via one or more buses 629. Buses 629 may be serial buses, parallel buses, other buses known in the art, or a combination of these, depending on the type of I/O devices 628 coupled to computer system 60.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer implemented method to assign an agent to an incoming call to a call center, the method comprising:
   in response to receipt at a call center of a call by a caller:
      generating, using a machine learning (ML) model, a compatibility index for the caller, wherein the compatibility index is indicative of attributes of the caller;
      generating an optimized raw compatibility index for the caller by applying a cost function to the compatibility index of the caller, wherein the cost function being solved to minimize dissatisfaction of the caller in handling of prior calls of the caller;
      generating a compatibility score for the caller based on the optimized raw compatibility index of the caller;
      generating, using the ML model, a compatibility index for individual agents available to handle the call, wherein the compatibility index for individual agents is indicative of attributes of the individual agent;
      generating an optimized raw compatibility index for the individual agents based on the compatibility index of the individual agents, wherein the optimized raw compatibility index for the individual agents is indicative of prior call handling metrics of the individual agents;
      generating a compatibility score for the individual agents based on the optimized raw compatibility index of the individual agents;
      matching the compatibility score for the caller to the compatibility scores for the individual agents; and
      assigning an agent to the call by applying a dining philosopher's problem to the compatibility scores for the caller and the individual agents.

2. The method of claim 1, wherein assigning an agent to the call comprises assigning an agent having a compatibility score that matches the compatibility score of the caller to the call.

3. The method of claim 1, wherein assigning an agent to the call comprises assigning an agent having a compatibility score that is closest to the compatibility score of the caller to the call.

4. The method of claim 1, wherein generating the compatibility score for the caller comprises applying a cost function to maximize caller satisfaction and potential upsell opportunities.

5. The method of claim 1, wherein generating the compatibility score for the individual agents comprises applying a cost function to maximize caller satisfaction and potential upsell opportunities.

6. A system comprising:
   one or more non-transitory machine-readable mediums configured to store instructions; and
   one or more processors configured to execute the instructions stored on the one or more non-transitory machine-readable mediums, wherein execution of the instructions causes the one or more processors to, responsive to receipt at a call center of a call by a caller:
      generate, using a machine learning (ML) model, a compatibility index for the caller, wherein the compatibility index is indicative of attributes of the caller;
      generate an optimized raw compatibility index for the caller by applying a cost function to the compatibility index of the caller, wherein the cost function being solved to minimize dissatisfaction of the caller in handling of prior calls of the caller;
      generate a compatibility score for the caller based on the optimized raw compatibility index of the caller;
      generate, using the ML model, a compatibility index for individual agents available to handle the call, wherein the compatibility index for individual agents is indicative of attributes of the individual agent;
      generate an optimized raw compatibility index for the individual agents based on the compatibility index of the individual agents, wherein the optimized raw compatibility index for the individual agents is indicative of prior call handling metrics of the individual agents;
      generate a compatibility score for the individual agents based on the optimized raw compatibility index of the individual agents;
      match the compatibility score for the caller to the compatibility scores for the individual agents; and
      assign an agent to the call by applying a dining philosopher's problem to the compatibility scores for the caller and the individual agents.

7. The system of claim 6, wherein to assign an agent to the call comprises to assign an agent having a compatibility score that matches the compatibility score of the caller to the call.

8. The system of claim 6, wherein to assign an agent to the call comprises to assign an agent having a compatibility score that is closest to the compatibility score of the caller to the call.

9. The system of claim 6, wherein to generate the compatibility score for the caller or the individual agents comprises to apply a cost function to maximize caller satisfaction and potential upsell opportunities.

10. A computer program product including one or more non-transitory machine-readable mediums encoding instructions that when executed by one or more processors cause a process to be carried out for assigning an agent to an incoming call to a call center, the process comprising:

in response to receipt at a call center of a call by a caller:
generating, using a machine learning (ML) model, a compatibility index for the caller, wherein the compatibility index is indicative of attributes of the caller;
generating an optimized raw compatibility index for the caller by applying a cost function to the compatibility index of the caller, wherein the cost function being solved to minimize dissatisfaction of the caller in handling of prior calls of the caller;
generating a compatibility score for the caller based on the optimized raw compatibility index of the caller;
generating, using the ML model, a compatibility index for individual agents available to handle the call, wherein the compatibility index for individual agents is indicative of attributes of the individual agent;
generating an optimized raw compatibility index for the individual agents based on the compatibility index of the individual agents, wherein the optimized raw compatibility index for the individual agents is indicative of prior call handling metrics of the individual agents;
generating a compatibility score for the individual agents based on the optimized raw compatibility index of the individual agents;
matching the compatibility score for the caller to the compatibility scores for the individual agents; and
assigning an agent to the call by applying a dining philosopher's problem to the compatibility scores for the caller and the individual agents.

11. The computer program product of claim 10, wherein assigning an agent to the call comprises assigning an agent having a compatibility score that matches the compatibility score of the caller to the call or assigning an agent having a compatibility score that is closest to the compatibility score of the caller to the call.

12. The computer program product of claim 10, wherein generating the compatibility score for the caller or the individual agents comprises applying a cost function to maximize caller satisfaction and potential upsell opportunities.

* * * * *